United States Patent [19]

Gasper

[11] Patent Number: 4,631,530

[45] Date of Patent: Dec. 23, 1986

[54] CHEMICAL PROCESS MONITOR

[75] Inventor: Kenneth E. Gasper, Leawood, Kans.

[73] Assignee: Olin Corporation, Cheshire, Conn.

[21] Appl. No.: 595,776

[22] Filed: Apr. 2, 1984

[51] Int. Cl.$^4$ .............................................. G08B 21/00
[52] U.S. Cl. .................................... 340/679; 210/143; 210/739; 340/540
[58] Field of Search ......................... 340/679, 527, 540; 210/140, 143, 104, 86, 85, 743, 739

[56] References Cited

U.S. PATENT DOCUMENTS

| | | | |
|---|---|---|---|
| 3,680,070 | 7/1972 | Nystuen | 340/527 |
| 4,087,700 | 5/1978 | Curiger et al. | 340/679 |
| 4,387,422 | 6/1983 | Steutermann | 364/183 |
| 4,435,291 | 3/1984 | Matsko | 210/743 |
| 4,509,618 | 4/1985 | Kühn | 340/679 |

Primary Examiner—Glen R. Swann, III
Attorney, Agent, or Firm—William A. Simons; Thomas P. O'Day

[57] ABSTRACT

A chemical process monitoring system wherein both a chemical process parameter control means (e.g. standard water treatment controller) and the means for adjusting the controlled process parameter (e.g. chemical feed pump) are simultaneously monitored through an interrogation means (e.g. microprocessor to determine if the adjusting means is successfully responding to the control means; and, if not, an alarm signal is generated to the operator.

17 Claims, 3 Drawing Figures

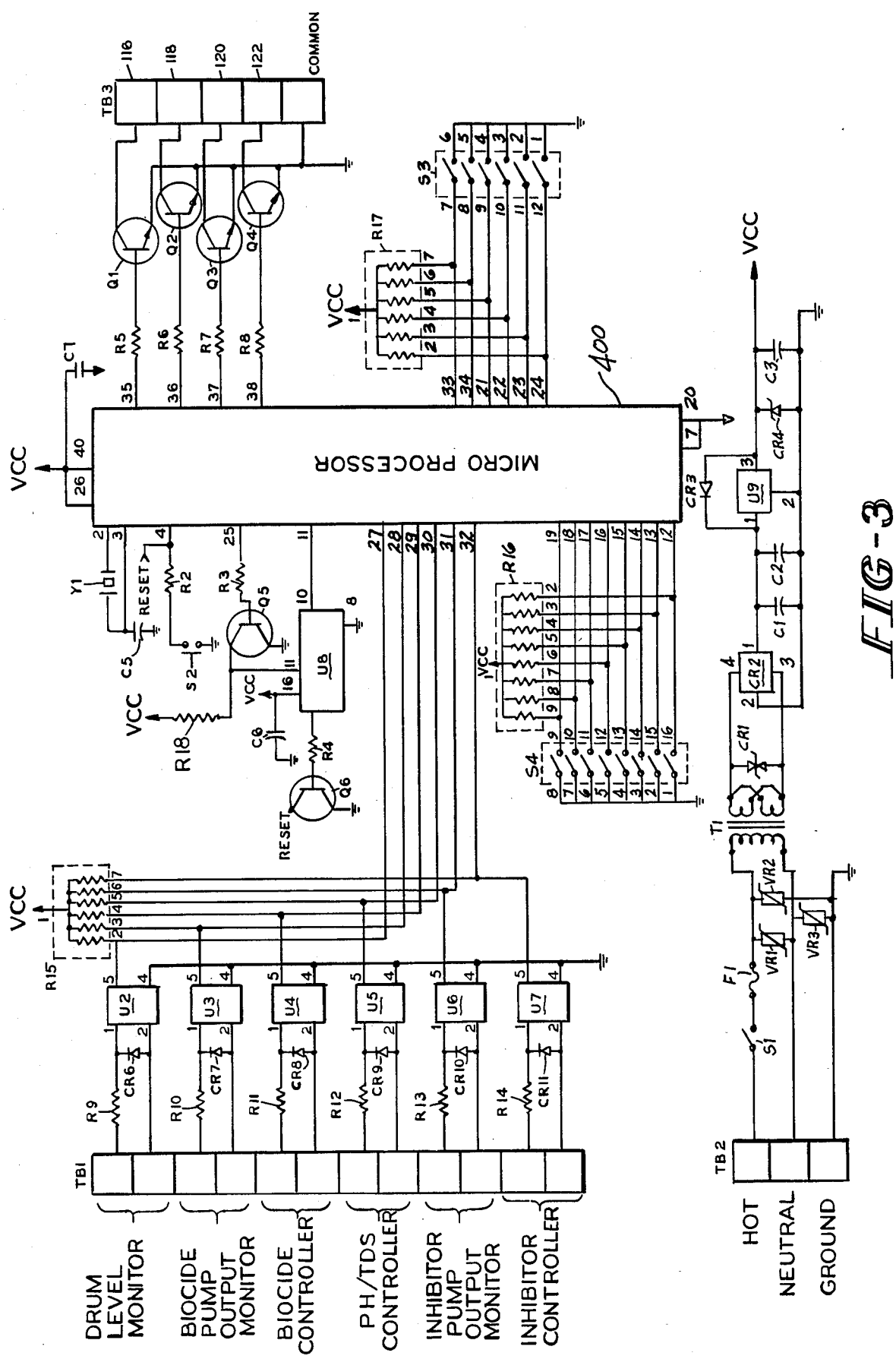

CHEMICAL PROCESS MONITOR

BACKGROUND OF THE INVENTION

1. Field of the Invention

This invention relates to a chemical process monitor and a monitoring process wherein a chemical process control means and an adjustment means for adjusting the controlled process parameter are simultaneously monitored. More particularly, this invention relates to a water treatment monitor system and a monitoring process wherein a water treatment controller and a positive displacement pump output monitor are simultaneously monitored. Still further, the present invention relates to a chemical process monitor system and a monitoring process wherein a multiplicity of chemical process control means and a multiplicity of adjustment means for adjusting the controlled process parameters are simultaneously monitored.

2. Brief Description of the Prior Art

Several methods are known for controlling the feeding of chemicals and solutions from holding tanks and the like into reactors, process streams or treatment streams. The simplest way is to employ a chemical feed pump with an on/off switch and transfer lines to move the chemical or solution from the holding tank to the reactor or the like. This method requires the costly presence of a human operator for this job and may be unsuitable in many situations (e.g. where the exact time for feeding is unpredictable or where the pump location is in an out-of-the-way location).

Other methods employ electromechanical control means (e.g. standard controllers) to determine when the chemicals or solutions should be transferred. The control means may either measure a property in the reactor or end-use stream or automatically time when the chemical should be fed. When either of these effects are sensed by the control means, it generates a signal to turn on the pump. The controller may also generate a second signal to turn off the pump when the measured property has changed to the desired level or when the feeding time has been completed. The use of such control means may reduce the cost of constant human monitoring; but it does not monitor the actual operation of the feed pump. Pumps may fail for a variety of reasons, including loss of prime, fouled check valves and blown fuses. Additional surveillance systems may be employed to monitor the operation of the pump and provide an alarm signal when the pump goes on or remains off. However, this may lead to the creation of many alarm signals, especially in those situations where it is normal for the pump to be on and off many times a day. In such cases, the operator's attention to true pump failures will be lessened. Undetected pump failures may cause process shutdowns or the production of poor quality products or untreated process streams or a combination of these undesirable effects within a short amount of time.

The present invention provides a means for simultaneously monitoring chemical process control means such as pump controllers and adjustment means for adjusting the controlled process parameters (e.g. pumps) and providing an alarm whenever the adjustment means fails to respond to the control means for whatever reason, yet allows enough time for the adjustment means to correct itself (e.g. to reprime itself as in the case of a pump) and avoid a false or unnecessary alarm signal from being made.

BRIEF SUMMARY OF THE INVENTION

The present invention, therefore, is directed to a monitor system for simultaneously monitoring both chemical process parameter control means and adjustment means for adjusting the controlled process parameter comprising adjustment means for adjusting a chemical process parameter;

(b) control means for sensing the chemical process parameter and generating a first output signal to the adjustment means when a predetermined condition exists, the first output signal capable of causing a positive response in the adjustment means;

(c) monitoring means for sensing whether the adjustment means made a positive response to the first output signal from the control means and for generating a second output signal as evidence of the positive response; and (d) interrogation means for sensing simultaneously both the first and second output signals and causing an interrogation sequence to begin, the interrogation sequence comprising (i) when the second output signal is not sensed within a predetermined time period after the beginning of the sensing of the first output signal, then an alarm signal is generated to an alarm annunciation means; and (ii) when the second output signal is sensed within the predetermined time period after the beginning of the sensing of the first output signal, then no alarm signal is generated to the alarm annunciation means.

One preferred embodiment of this monitor system contemplates its use in a water treatment process wherein adjustment means (a) is a positive displacement chemical feed pump, control means (b) is a standard pump controller and monitoring means (c) is a positive displacement pump output monitor. Interrogation means (d) is preferably an interface module comprising a microprocessor capable of receiving at least two output signals with time-delay circuitry and open/closed selector switch circuitry attached thereto which together carrys out the above-defined interrogation sequence.

Another preferred embodiment of this invention is to use a multiplicity of adjustment means (a), control means (b) and monitoring means (c) which provide at least one interrogation means (d) with a multiplicity of corresponding dual output signals. Thus, many parameters of a single process may be monitored simultaneously and problems may be detected immediately and individually corrected.

The present invention also is directed toward the process for simultaneously monitoring a chemical process parameter control means and an adjustment means for adjusting said controlled process parameter comprising the steps of:

(1) sensing a chemical process parameter with the control means, the control means generating a first output signal to the adjustment means when a predetermined condition exists, the first output signal causing a positive response in the adjustment means;

(2) sensing the controlled adjustment means with a monitoring means, the monitoring means generating a second output signal when the adjustment means makes a positive response to first output signal; and (3) simultaneously sensing the first and second output signals with an interrogation means, which causes an interrogation sequence to be carried out, said interrogation sequence comprising:
  (a) when the second output signal is not sensed within a predetermined time period after the beginning of the sensing of the first output signal, then an alarm signal is generated to an alarm annunciation means; and
  (b) when the second output signal is sensed within the predetermined time period after the beginning of the sensing of the first output signal, then no alarm signal is generated to an alarm annunciation means.

A preferred embodiment of this process of the present invention contemplates simultaneously monitoring a water treatment process parameter controller and a positive displacement chemical feed pump controlled by said controller.

Another preferred embodiment of this process of this invention contemplates simultaneously monitoring a multiplicity of chemical process parameter control means and a multiplicity of adjusting means for adjusting said controlled process parameters.

BRIEF DESCRIPTION OF THE DRAWINGS

FIG. 3 is a schematic diagram of the microprocessor, input signal circuitry, time-delay switch circuitry, power supply circuitry, protection circuitry, open/closed selector switch circuitry and output signal circuitry of the interface module.

DETAILED DESCRIPTION OF THE PREFERRED EMBODIMENT

Figure 1:
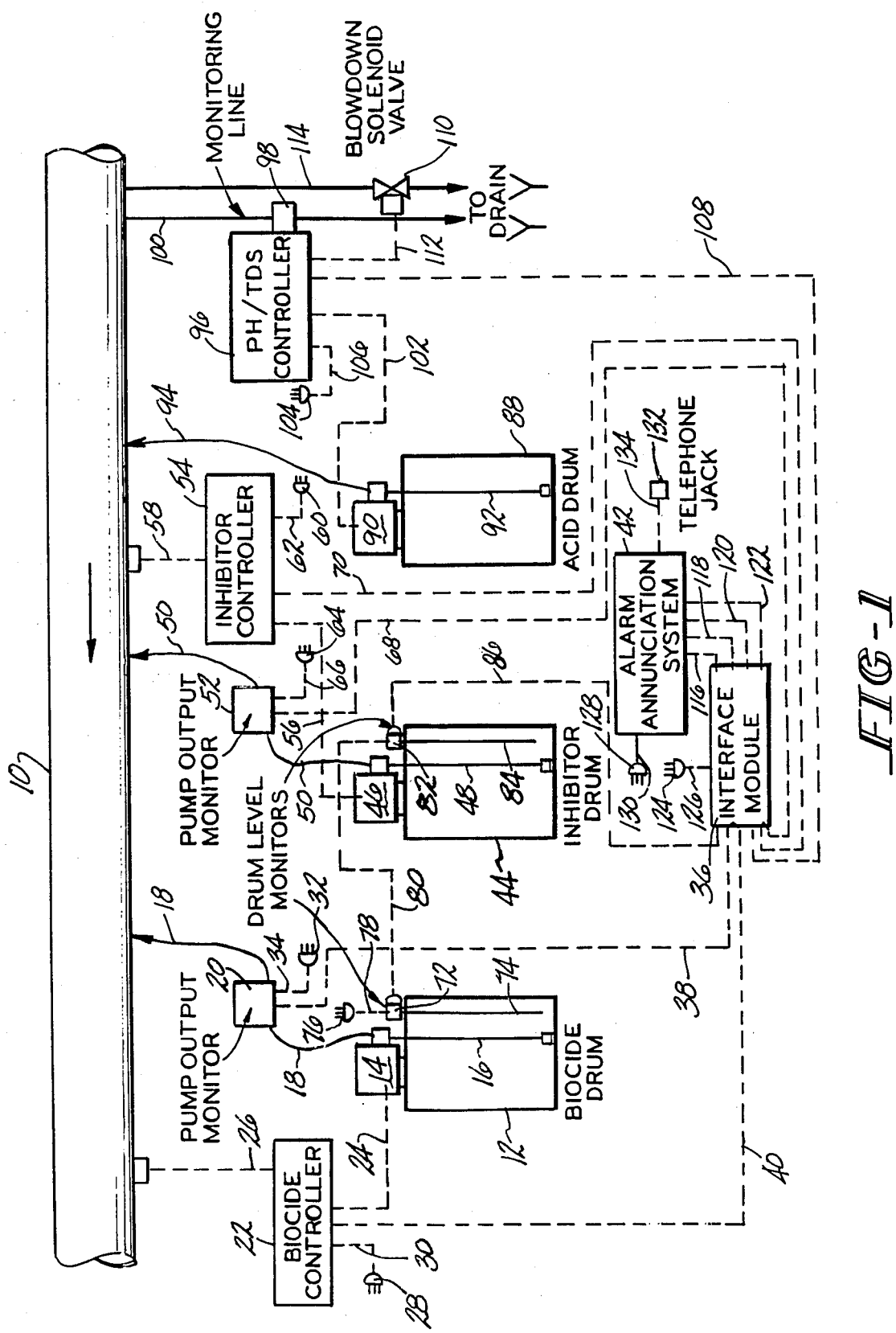
FIG. 1 is a schematic drawing of a preferred embodiment of the present invention.

FIG. 1 illustrates a preferred embodiment of the present invention as applied to a water treatment process stream 10. The monitoring system of this invention confirms that a biocide solution and a scale and corrosion inhibitor solution are being fed individually into the treatment stream. This monitoring system is being employed in conjunction with other operations which monitor the liquid level in the drums and the pH and conductivity of the water treatment stream.

A liquid biocide chemical is fed from drum 12 by positive displacement pump 14 through inlet pump line 16 and outlet pump line 18 and pump output monitor 20 into process stream 10. The operation of the pump 14 is controlled by biocide controller 22 through electrical line 24. The biocide controller 22 may be any standard controller or control means normally employed for this controlling of chemical feed pumps. The controller 22 may either measure a property in process stream 10 by electrical line 26 or more preferably be a timer which signals the pump to operate at desired time intervals. The biocide controller 22 is powered by a standard electrical power source through electrical connection 28 and electric power line 30.

Pump output monitor 20 may be any monitor which is capable of monitoring the output from a pump and includes a sensing means for sensing whether there is any output from the pump passing through output line 18 and a means for translating the presence or absence of that output into an electric signal which may be received and monitored remotely from the pump. A preferred pump output monitor is disclosed in co-pending patent application filed the same day by Kenneth Gasper and Raymond Ehrhart and assigned to Olin Corporation and entitled "Postive Displacement Pump Output Monitor" (U.S. patent application Ser. No. 595,808 filed on Apr. 2, 1984). This application is incorporated herein by reference in its entirety. Pump output monitor 20 is powered by an electrical power source through electrical connection 32 and electric line 34.

Both pump output monitor 20 and biocide controller 22 are connected to interface module 36 through electrical lines 38 and 40, respectively. Each time the biocide controller comes on, calling for biocide feed, an electrical signal is sent to pump 14 to turn ON. Also, an electric signal is sent to interface module 36 to initiate interrogation of the operation of the biocide feed pump output monitor 20. The interface module 36 awaits an electric signal from the pump output monitor 20 and if it does not receive such a signal within a predetermined amount of time, an alarm or fault signal is transmitted to alarm annunciation system 42. If that electric signal is received by the interface module 36 before that predetermined time period is up, then no alarm or fault signal is sent. Usually, a time-delay period of at least about 20 seconds is provided to allow for a loss of prime by the biocide pump and its normal self-priming. Preferably, time-delay periods from about 20 seconds to about 60 minutes are suitable for most operations.

The scale and corrosion inhibitor feed stream may be monitored by the same method as the biocide feed. A liquid inhibitor chemical is fed from drum 44 by positive displacement pump 46 through inlet pump line 48 and outlet pump line 50 into process stream 10. The operation of pump 46 is controlled by inhibitor controller 54 through electrical line 56. The inhibitor controller 54 may be any standard controller or control means normally employed for the controlling of chemical feed pumps. The controller 54 measures a property in process stream 10 through electrical line 58. The property measured may be the conductivity of the process stream 10. The inhibitor controller 54 is powered by a standard electrical power source through electrical connection 60 in electric power line 62.

Pump output monitor 52 may be the same type of monitor used for the biocide feed. A preferred pump output monitor for this inhibitor feed is the same one as disclosed in the above-noted co-pending patent application. Pump output monitor 52 is powered by an electrical power source through electrical connection 64 and electric line 66. Both pump output monitor 52 and inhibitor controller 54 are connected to interface module 36 through electrical lines 68 and 70, respectively. Each time the inhibitor controller comes on, calling for an inhibitor feed, an electrical signal is sent to turn on pump 46. Also, an electrical signal is sent to interface module 36 to initiate interrogation of the operation of the inhibitor feed output monitor 52. The interface module 36 awaits an electrical signal from the pump output monitor 52 and if it does not receive such a signal within a predetermined amount of time an alarm or fault signal is transmitted to the alarm annunciation system 42. If that electrical signal is received by the interface module 36 before the predetermined time period is up, then no alarm or fault signal is sent. Again, a time-delay period of at least about 20 seconds is provided to allow for a temporary loss of prime by the inhibitor pump and its normal self-priming. Preferably time-delay periods from about 20 seconds to about 60 minutes are suitable for most applications.

The levels of drums 12 and 44 are also monitored by this system. Biocide drum 12 has low level monitor 72 which has a liquid level sensor 74 attached thereto. This level monitor 72 is powered by an electrical power source with electrical connection 76 and electrical line 78. The level of the liquid in drum 12 as sensed by sensor 74 is translated into an electric signal through line 80 to interface module 36. Likewise, inhibitor drum 44 has low level monitor 82 which has a liquid level sensor 84 attached thereto. Level monitor 82 is placed in series with level monitor 72 and is powered by the same electrical source with electrical connection 76 through electric line 78. The level of liquid in drum 12 as sensed by sensor 84 is translated into an electric signal through line 86 to interface module 36. Since level monitors 72 and 82 are in series, a low level alarm signal will be given off if either is low. Upon reviewing the alarm signal, an operator will check the level of each drum to determine which is low. If the drums are checked before an alarm signal is given, it may be desirable to program a time-delay into interface module 36 to give an operator time to change drums without causing a fault alarm from being signalled. A time-delay from about 20 to 120 minutes should be suitable for most installations.

The system also monitors the pH and ionic conductivity of water treatment stream 10. Acid (e.g. $H_2SO_4$ or another suitable acid) is stored in acid drum 88 and pumped into the stream 10 by a positive displacement chemical feed pump 90 through pump inlet line 92 and pump outlet 94. The operation of pump 90 is controlled by a standard pH/conductivity (Total Dissolved Solids) controller 96 which measures the pH of stream 10 by an electrical sensor 98 attached to monitoring line 100. When the pH of the stream is sensed to be too high, the controller 96 sends an electrical signal to pump 90 by electrical line 102. When sufficient acid is pumped into stream 10, the sensor 98 which senses that pH has reached a desired low pH and controller 96 will send an electrical signal to pump 90 to turn off. Controller 96 is powered to an electrical power source by electrical connection 104 and electrical line 106. Controller 96 sends an electrical signal to interface module 36 when it signals pump 90. The interface module 36 may be programmed to send out an alarm signal to the alarm annunciation system 42 if said electrical signal from controller 96 is not turned off by satisfacting the acid addition requirement within a desired amount of time. Normal acid addition times may range from about 1 minute to about 60 minutes. Thus, it would be desirable to set the time-delayed alarm signal at a time slightly longer than that normal time period. Sensor 98 may also include a conductivity monitor that controls the mineral concentration level in water stream 10 by opening and closing an electrically operated (solenoid) blowdown valve. Accordingly, if sensor 98 senses that the mineral concentration of the water stream 10 exceeds the control point, controller 96 will signal blowdown solenoid valve 110 to open with an electric signal through electric line 112. When the sensor 98 senses that the conductivity reaches a desired lower level, an electric signal is sent from controller 96 through line 112 to close blowdown solenoid valve 110 thereby shutting down blowdown line 114.

As can be seen from FIG. 1, interface module 36 has six input electrical signal lines going into it. Electrical line 86 carries an electric signal for monitoring the drum levels. Electrical lines 38 and 40 carry electrical signals for monitoring the biocide pump 20 and biocide controller 22, respectively. These two electrical signals are integrated according to the present invention in the interface module 36. Electrical line 108 carries the electrical signal for monitoring the pH/TDS controller 96. Electrical lines 68 and 70 carry electrical signals for monitoring inhibitor pump 46 and inhibitor controller 54, respectively. These two electrical signals are integrated according to the present invention in the interface module 36.

Interface module 36 has four output signal lines 116, 118, 120 and 122, which are connected to the alarm annunciation system 42. Line 116 represents the drum level monitor. Line 118 represents the integrated biocide pump/controller signal. Line 120 represents the pH/TDS controller signal. Line 122 represents the integrated inhibitor pump/controller signal. Each of these output signals may be subjected to individually predetermined time-delays in the interface module 36 before being sent to the alarm annunciation system 42.

Interface module 36 is powered by an electrical power source by electrical connection 124 and electrical power line 126. Alarm annunciation system 42 is also powered by an electrical power source through electrical connection 128 and electrical power line 130. The annunciation system 42 may be attached to telephone jack 132 by telephone line 134 so that the alarm signals may be automatically telephoned to operators at remote locations from the interface module 36 and alarm annunciation system 42.

Figure 2:
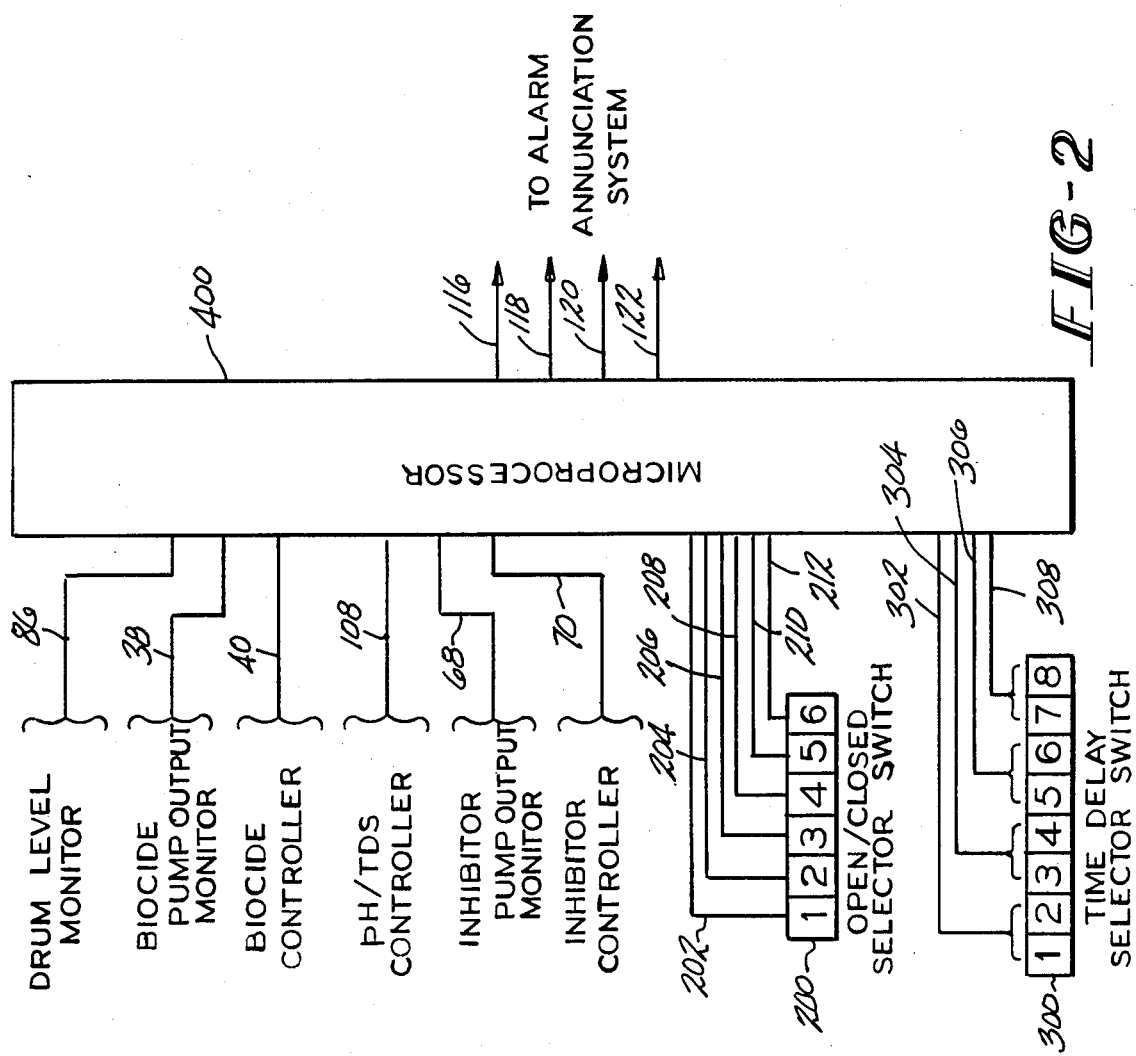
FIG. 2 is a schematic representation of input controls for an interface module employed as the integration meanss of the present invention.

FIG. 2 shows the input controls to interface module 36. These input controls include the six output signal wires 86, 38, 40, 108, 68 and 70 from the six above-mentioned process functions being monitored along with an open/closed selector switch panel 200 and a time-delay selector switch panel 300.

The open/closed selector switch panel allows these six input signals going into microprocessor 400 to be programmed as active when 115 VAC is applied or active when 115 VAC is absent. The active status for each signal may be selected with a rocker switch in the panel 200. Position 1 controls the Drum Level Monitor. Position 2 controls the Biocide Pump Output Monitor. Position 3 controls the Biocide Controller. Position 4 controls the pH/TDS Controller. Position 5 controls the Inhibitor Pump Output Monitor. Position 6 controls the Inhibitor Controller. These six switches are connected to the microprocessor 400 by electrical lines 202, 204, 206, 208, 210 and 212, respectively.

To select a channel to be active with 115 VAC applied, the switch position should be in the open position. To select a channel to be active without 115 VAC applied, the switch position should be in the closed position. Normally, the input from the Drum Level Monitor is in the Closed position and all of the others are in the Open position.

The time-delay selector switch panel 300 allows the interface module 36 to employ four different preprogrammed time-delay periods for each output signal to the alarm annunciation system. These four different time delays are selected by pairs of rocker switches in panel 300. Positions 1 and 2 provide the time delays for signals from the Drum Level Monitor. Positions 3 and 4 provide the time delays for the integrated signal from the Biocide Controller/Pump Output Monitor. Positions 5 and 6 provide the time delays for the pH/TDS Controller. Positions 7 and 8 provide the time delays for the integrated signal from the Inhibitor Controller/Pump Output Monitor. The following Table 1 indicates the preferred time delays and their rocker switch settings.

TABLE 1

Time Delay Settings

| Drum Level Monitor | Pos (1) | Pos (2) | Biocide Controller/Pump | Pos (3) | Pos (4) |
|---|---|---|---|---|---|
| NO-DELAY | CLOSED | CLOSED | 3 min. | CLOSED | CLOSED |
| 15 min. | OPEN | CLOSED | 6 min. | OPEN | CLOSED |
| 30 min. | CLOSED | OPEN | 9 min. | CLOSED | OPEN |
| 45 min. | OPEN | OPEN | 12 min. | OPEN | OPEN |
| pH/TDS CONTROLLER | Pos (5) | Pos (6) | INHIBITOR CONTROLLER/PUMP | Pos (7) | Pos (8) |
| NO-DELAY | CLOSED | CLOSED | 60 sec. | CLOSED | CLOSED |
| 5 sec. | OPEN | CLOSED | 90 sec. | OPEN | CLOSED |
| 10 sec. | CLOSED | OPEN | 120 sec. | CLOSED | OPEN |
| 15 sec. | OPEN | OPEN | 180 sec. | OPEN | OPEN |

The most preferred settings of this water treatment application are 30 minutes for the Drum Level Monitor; 9 minutes for the Integrated biocide Controller/Pump; 10 seconds for pH/TDS Controller and 180 seconds for Integrated Inhibitor Controller/Pump. It should be noted that the length of time for time-delays is not limited to the preferred settings listed above. In different applications a DIP switch attached on the microprocessor 400 may be adjusted for each function to permit other preprogrammed time settings.

FIG. 3 shows a preferred interface module and how it comprises a microprocessor with external circuitry. In the top left-hand corner is the input signal conditioning circuitry for the microprocessor 400. TB1 is a terminal barrier or strip having lead connections for the wires 86, 38, 40, 108, 68 and 70, respectively. The hot lead for each is on top and the common lead of each is on the bottom. Each input signal is conditioned by circuit comprising a resistor (R9 to R14), diode (CR6 to CR11) and a phototransistor (U2 to U7) having four leads. After this electrical conditioning, the input signals are passed into microprocessor 400 by wires 27, 28, 29, 30, 31 and 32. These wires are connected to a bank of six resistors R15 by wires 2, 3, 4, 5, 6 and 7.

At the bottom of FIG. 3 is the power input conditioning circuitry. Electrical power is supplied to the microprocessor 400 through terminal barrier or strip TB2. The current passes through on/off switch S1 and fuse F1 and through three Type L varistors VR1, VR2 and VR3 before entering power transformer T1. The partially conditioned input current is further conditioned through zener diode CR1 and bridge rectifier CR2, capacitors C1, C2 and C3, diodes CR3 and CR4 and power transistor U9.

The lower left hand side of the microprocessor 400 shows the time-delayed circuitry. S4 is an 8-rocker DIP switch which is attached to the microprocessor 400 by wires 12, 13, 14, 15, 16, 17, 18 and 19. These wires are also attached to a bank of 8 resistors R16. As mentioned above, the actual time-delay is programmed in the logic circuits within the microprocessor 400.

The open/closed selector switch circuitry is shown in the lower right hand side of microprocessor 400. The 6 rocker DIP switch S3 is attached to the microprocessor 400 by wires 33, 34, 21, 22, 23 and 24. These wires are also attached to a bank of 6 resistors R17.

The output signal wires 116, 118, 120 and 122 are sent from microprocessor 400 to the alarm annunciation system 42. The output signal conditioning circuitry is shown in upper right hand side of the microprocessor 400.

Terminal barrier or strip TB3 contains the leads for these output signal wires. Each output signal is conditioned by one of the resistors R5 to R8 and transistors Q1 to Q4, respectively.

The power input to the logic circuitry of microprocessor 400 is shown at the top of the microprocessor. Protection circuitry is shown on the upper left-hand side of the microprocessor. Microprocessor crystal Y1 is connected to capacitor C5. Reset circuitry is shown with reset switch S2 and resistor R2. Also shown in the protection circuit having resistor R3, transistor Q5, resistor R18, COS-MOS integrated circuitry U8, capacitor C6, resistor R4 and transistor Q6.

In the exemplary circuits in FIG. 3, the values of the various circuit components may be as follows:

| | |
|---|---|
| Microprocessor 400 | Intel 8748 |
| Resistors R9 to R14 | 20K, 3W |
| Diodes CR6 to CR11 | IN 4004 |
| Phototransistors U2 to U7 | H11A1 |
| Bank of 6 Resistors R15 | 4.5K Dale-1-4726-8326 |
| Switch S1 | SK 7107 Switch |
| Fuse F1 | Y2 Amp |
| Type L Varistors VR1 to VR3 | GEV150LA10A |
| Signal Transformer T1 | ST-4-16 |
| Zener diode CR1 | 1.5KE62C |
| Bridge Rectifier CR2 | VM28 |
| Capacitor C1 | 1000 microfarads |
| Capacitor C2 | 0.1 microfarads |
| Power Transistor U9 | TO-220AB |
| Diode CR3 | IN4816 |
| Rocker DIP Switch 54 | Type 76-SB08 |
| Bank of 8 Resistors R16 | 10K Dale 1-036-8329 |
| Rocker DIP Switch 53 | Type 76-SB06 |
| Bank of 6 Resistors | 10K Dale-1-1036-8334 |
| Resistors R5 to R8 | 1K |
| Transistors Q1 to Q4 | PN2222A |
| Capacitor C7 | 0.1 microfarad |
| Microprocessor crystal Y1 | 6 Mhz |
| Capacitor C5 | 20pf |
| Resistor R2 | 1K |
| Reset Switch S2 | 1A-120VAC CNK-T12 |
| Resistor R3 | 4.7 resistor |
| Transistor Q5 | PN2222A |
| Resistor R18 | 20K |
| COS-MOS Integrated Circuitry U8 | RCA CD4020 |
| Capacitor C6 | 0.1 microfarad |
| Resistor R4 | 1K |
| Transistor Q6 | PN2222A |

The present invention has numerous advantages associated with it. The equipment employed is inexpensive and easy to set up. Standard controllers and alarm annunciation equipment is used. The invention allows for continuous monitoring without the presence of a human operator nearby. With a multiple automatic telephone hookup, the alarm annunciation equipment is able to ensure that the appropriate person will be notified as soon as a true malfunction is detected, thus avoiding costly upsets. The length of time between personal inspections to on-site locations can be lengthened. The present invention is adaptable to almost every operation in a chemical plant or treatment center requiring monitoring. For example, it may be utilized in boiler treatment monitoring including chemical feeding and blowdown control.

What is claimed is:

1. A monitor system for simultaneously monitoring both chemical process parameter control means and adjustment means for adjusting the controlled process parameter comprising:
   (a) adjustment means for adjusting a chemical process parameter;
   (b) control means for sensing said chemical process parameter and for generating a first output signal to said adjustment means when a predetermined condition exists, said first output signal capable of causing a positive response in said adjustment means;
   (c) monitoring means for sensing whether said adjustment means made a positive response to said first output signal from said control means and for generating a second output signal as evidence of said positive response; and
   (d) interrogation means for sensing both said first and second output signals and for performing an interrogation, said interrogation comprising:
      (i) when said second output signal is not sensed within a predetermined time period after the beginning of said sensing of said first output signal, then an alarm signal is generated to an alarm annunciating means; and
      (ii) when said second output signal is sensed within said predetermined time period after the beginning of said sensing of said first output signal, then no alarm signal is generated to said alarm annunication means.

2. The monitor system of claim 1 wherein said adjustment means (a) is a positive displacement chemical feed pump.

3. the monitor system of claim 1 wherein said chemical process parameter is the concentration of a chemical in a process stream.

4. The monitor system of claim 1 wherein said monitoring means (c) is a positive displacement pump output monitor.

5. The monitor system of claim 1 wherein said interrogation means is an interface module comprising a microprocessor capable of receiving at least one set of said first and second output signals, time-delay switch circuitry to determine the predetermined time period of said interrogation sequence, and open/closed selector switch circuitry to choose the active status of said output signals.

6. The monitor system of claim 1 wherein said chemical process is a water treatment process.

7. A monitor system for simultaneously monitoring both a water treatment process parameter controller and a positive displacement chemical feed pump controlled by said controller, comprising
   (a) positive displacement chemical feed pump;
   (b) controller for sensing said water treatment process parameter and for generating a first output signal to said pump when a predetermined condition exists, said first output signal causing a positive response in said pump;
   (c) monitoring means for sensing whether said pump made a positive response to said first output signal from said controller and for generating a second output signal as evidence of said positive response; and
   (d) interrogation means for sensing both said first and second output signals and for performing an interrogation, said interrogation comprising:
      (i) when said second output signal is not sensed within a predetermined time period after the beginning of said sensing of said first output signal, then an alarm signal is generated to an alarm annunciating means; and
      (ii) when said second output signal is sensed within said predetermined time period after the beginning of said sensing of said first output signal, then no alarm signal is generated to said alarm annunciation means.

8. The monitor system of claim 7 wherein said monitoring means is a positive displacement pump output monitor.

9. The monitor system of claim 7 wherein said interrogation means is an interface module comprising a microprocessor capable of receiving at least one set of said first and second output signals, time-delay switch circuitry to determine the predetermined time delay of said interrogation sequence, and open/closed selector switch circuitry to choose the active status of said output signals.

10. A monitor system for simultaneously monitoring a multiplicity of chemical process parameter control means and corresponding adjustment means for adjusting the controlled parameters comprising
   (a) a multiplicity of adjustment means for adusting individual chemical process parameters;
   (b) a multiplicity of control means, each of which senses a chemical process parameter and generates a first output signal to said corresponding adjustment means when a predetermined codition exists, each first output signal causing a positive response in said corresponding adjustment means;
   (c) a multiplicity of monitoring means each of which senses whether said corresponding adjustment means made a positive response to said first output signal from said corresponding control means and generates a second output signal as evidence of said positive responses; and
   (d) interrogation means for sensing all of said corresponding first and second output signals and for performing an interrogation, said interrogation comprising:
      (i) when a corresponding second output signal is not sensed within a predetermined time period after the beginning of said sensing of a corresponding first output signal, then an alarm signal is generated to an alarm annunciating means; and
      (ii) when said corresponding second output signal is sensed within said predetermined time period after the beginning of said sensing of said corresponding first output signal, then no alarm signal is generated to said alarm annunciation means.

11. The monitor system of claim 10 wherein said chemical process is a water treatment process.

12. A process for simultaneously monitoring a chemical process parameter control means and an adjustment means for adjusting said controlled process parameter comprising the steps of:
   (1) sensing a chemical process parameter with said control means, said control means generating a first output signal to said adjustment means when a predetermined condition exists, said first output signal causing a positive response in said adjustment means;
   (2) sensing said adjustment means with a monitoring means, said monitoring means generating a second output signal when said adjustment means makes a positive response to first output signal; and
   (3) sensing said first and second output signals with an interrogation means, which performs an interrogation sequence, said interrogation sequence comprising:
      (a) when said second output signal is not sensed within a predetermined time period after the beginning of said sensing of said first output signal, then an alarm signal is generated to an alarm annunciating means; and
      (b) when said second output signal is sensed within said predetermined time period after the beginning of said sensing of said first output signal, then no alarm signal is generated to an alarm annunucation means.

13. The process of claim 12 wherein said chemical process is a water treatment process.

14. The process of claim 12 wherein said chemical process is a water treatment process.

15. An interface module employed in a monitor system for simultaneously monitoring both chemical process parameter control means and adjustment means for adjusting the controlled process parameter comprising
   (a) microprocessor having sensing means for sensing a first output signal from at least one chemical process parameter control means and for sensing a second output signal from at least one adjustment means for adjusting the controlled process parameter, said microprocessor programmed to begin an interrogation sequence for each set of corresponding output signals, said interrogation sequence comprising
      (i) when said second output signal is not sensed within a predetermined time period after the beginning of said sensing of said first output signal, then an alarm signal is generated to an alarm annunciating means; and
      (ii) when said second output signal is sensed within said predetermined time period after the beginning of said sensing of said first output signal, then no alarm signal is generated to said alarm annunciation means; and
   (b) means for determining the time delayed period for each interrogation sequence;
   (c) means for determining the active status of each signal received from said control means and said adjustment means; and
   (d) means for electrically energizing said microprocessor (a) and means (b) and (c).

16. A process for simultaneously monitoring a water treatment process parameter controller and a positive displacement chemical feed pump controlled by said controller comprising the steps of:
   (1) sensing a water treatment process parameter with said controller, said controller generating a first output signal to said pump when a predetermined condition exists, said first output signal causing a positive response in said pump;
   (2) sensing the output of said pump with a pump output monitor, said output monitor generating a second output signal when said output monitor makes a positive response to first output signal; and
   (3) sensing said first and second output signals with an interrogation means, which performs an interrogation sequence, said interrogation sequence comprising:
      (a) when said second output signal is not sensed within a predetermined time period after the beginning of said sensing of said first output signal, then an alarm signal is generated to an alarm annunciating means; and
      (b) when said second output signal is sensed within said predetermined time period after the beginning of said sensing of said first output signal, then no alarm signal is generated to an alarm annunciation means.

17. A process for simultaneously monitoring a multiplicity of chemical process parameter control means and the corresponding adjustment means for adjusting said controlled process parameters comprising the steps of:
   (1) sensing a multiplicity of chemical process parameters with a multiplicity of said control means, each control means generating a first output signal to said coressponding adjustment means when a predetermined conditin exists, each first output signal causing a positive response in said corresponding adjustment means;
   (2) sensing said multiplicity of adjustment means with a multiplicity of monitoring means, each monitoring means generating a second output signal when said corresponding adjustment means makes a positive response to first output signal from corresponding controller; and
   (3) sensing all of said first and second output signals with an interrogation means, which performs an interrogation sequence, said interrogation sequence comprising:
      (a) when a corresponding second output signal is not sense within a predetermined time period after the beginning of said sensing of a corresponding first output signal, then an alarm signal is generated to an alarm annunciating means; and
      (b) when a corresponding second output signal is sensed within said predetermined time period after the beginning of said sensing of a corresponding first output signal, then no alarm signal is generated to an alarm annuciation means.

* * * * *